(12) United States Patent
Coulmeau

(10) Patent No.: US 8,437,887 B2
(45) Date of Patent: May 7, 2013

(54) METHOD FOR OPTIMIZING A FUEL CONSUMPTION OF AN AIRCRAFT DURING THE FLIGHT THEREOF

(75) Inventor: François Bernard René Coulmeau, Seilh (FR)

(73) Assignee: Thales, Neuilly sur Seine (FR)

( * ) Notice: Subject to any disclaimer, the term of this patent is extended or adjusted under 35 U.S.C. 154(b) by 892 days.

(21) Appl. No.: 12/095,049

(22) PCT Filed: Nov. 22, 2006

(86) PCT No.: PCT/EP2006/068734
§ 371 (c)(1),
(2), (4) Date: Jul. 30, 2008

(87) PCT Pub. No.: WO2007/060169
PCT Pub. Date: May 31, 2007

(65) Prior Publication Data
US 2008/0294304 A1  Nov. 27, 2008

(30) Foreign Application Priority Data

Nov. 25, 2005 (FR) .................... 05 11965

(51) Int. Cl.
*G05D 1/00* (2006.01)
*G06F 19/00* (2006.01)
(52) U.S. Cl.
USPC ............. 701/3; 701/1; 701/4; 701/7; 701/11; 701/99; 701/101; 701/102; 701/110; 701/121
(58) Field of Classification Search .................. None
See application file for complete search history.

(56) References Cited

U.S. PATENT DOCUMENTS

| | | | | |
|---|---|---|---|---|
| 4,312,041 A * | 1/1982 | DeJonge | 701/123 |
| 4,642,775 A * | 2/1987 | Cline et al. | 701/528 |
| 5,121,325 A * | 6/1992 | DeJonge | 701/123 |
| 5,835,879 A * | 11/1998 | Bush | 701/123 |
| 6,275,768 B1 * | 8/2001 | Zobell et al. | 701/123 |
| 6,484,088 B1 * | 11/2002 | Reimer | 701/123 |
| 6,571,171 B1 * | 5/2003 | Pauly | 701/528 |
| 7,010,399 B2 * | 3/2006 | Rupe | 701/3 |
| 7,606,641 B2 * | 10/2009 | Allen | 701/3 |
| 2005/0159878 A1 * | 7/2005 | Coggins et al. | 701/123 |
| 2005/0267673 A1 * | 12/2005 | Blagg et al. | 701/123 |
| 2005/0283281 A1 * | 12/2005 | Hartmann et al. | 701/4 |
| 2007/0032921 A1 * | 2/2007 | Allen | 701/3 |
| 2007/0032941 A1 * | 2/2007 | Allen | 701/123 |
| 2008/0195442 A1 * | 8/2008 | Blagg et al. | 705/7 |
| 2009/0125222 A1 * | 5/2009 | McCullough et al. | 701/120 |
| 2009/0281715 A1 * | 11/2009 | Paik | 701/123 |

FOREIGN PATENT DOCUMENTS

GB          743529          1/1956

* cited by examiner

*Primary Examiner* — Ian Jen
(74) *Attorney, Agent, or Firm* — Lowe Hauptman Ham & Berner, LLP

(57) ABSTRACT

The invention relates to a method for optimizing the fuel consumption of an aircraft during flight. At a given point of the flight, a fuel excess (EXTRA) is determined relative to the statutory loads depending on the flight profile and weather conditions forecast for the rest of the flight. If the excess (EXTRA) is less than a given value (EXTRA-mini), for at least one of the forthcoming flight phases (①, ②, ③), the speed of the aircraft is adjusted so as to increase the excess (EXTRA).

4 Claims, 2 Drawing Sheets

METHOD FOR OPTIMIZING A FUEL CONSUMPTION OF AN AIRCRAFT DURING THE FLIGHT THEREOF

CROSS-REFERENCE TO RELATED APPLICATIONS

The present Application is based on International Application No. PCT/EP2006/068734, filed on Nov. 22, 2006, which in turn corresponds to French Application No. 05 11965 filed on Nov. 25, 2005, and priority is hereby claimed under 35 USC §119 based on these applications. Each of these applications are hereby incorporated by reference in their entirety into the present application.

TECHNICAL FIELD

The invention relates to a method for optimizing the fuel consumption of an aircraft during flight.

BACKGROUND OF THE INVENTION

Determination of fuel loads is carried out before take-off based on information about the flight plan and the forecast weather situation along the route. More precisely, the statutory loads comprise:
   the fuel necessary for reaching the destination, depending on the flight profile and the estimated average wind over the route;
   a reserve of 5% for the flight contingencies;
   a 30 minute reserve for carrying out a possible holding pattern on arrival before landing; and
   a reserve for being rerouted to an airport other than the destination.

When filling up with fuel, an excess in relation to the statutory loads may be loaded, this excess is commonly called "extra fuel" in the literature.

Generally, the excess is determined before take-off in order to fill up the aircraft with fuel. This calculation is not repeated subsequently. In the case of changes in weather conditions and in particular if the present conditions on the route lead to an increase in fuel consumption, it is possible to arrive at a situation where the excess becomes negative, which is problematic for flight safety.

SUMMARY OF THE INVENTION

The invention aims to solve this problem by means of a method allowing flight safety to be improved by suggesting a change in the flight profile to the pilot so as to avoid a negative excess or at the very least a possible fuel deficit.

To this end, the subject of the invention is a method for optimizing the fuel consumption of an aircraft during flight. At a given point of the flight, fuel excess is determined relative to the statutory loads depending on the flight profile and weather conditions forecast for the rest of the flight.

If the excess is less than a given value, for at least one of the forthcoming flight phases, the speed of the aircraft is adjusted so as to increase the excess.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE PREFERRED EMBODIMENT

Figure 1:
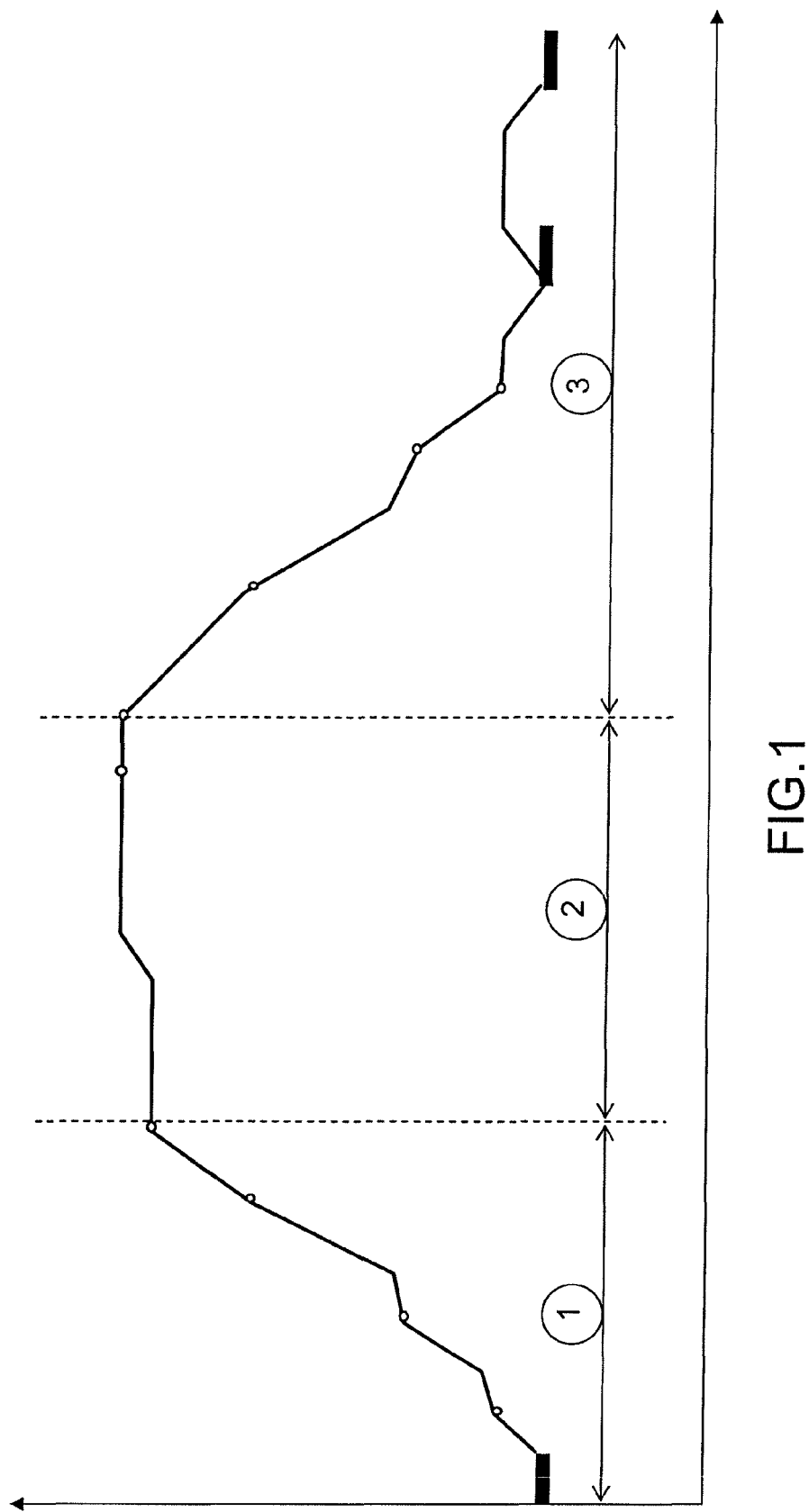
FIG. 1 shows an example of a flight profile.

FIG. 1 shows the distance traveled by the aircraft on the x-axis and its altitude on the y-axis. The figure is not to scale. The flight profile represented in FIG. 1 comprises three flight phases: an ascent phase ①, a cruise phase ②, and a descent phase ③.

The fuel consumption of the aircraft is essentially proportional to its speed. In modern flight control systems performance tables are available allowing calculation of the mass fuel rate of flow, by phase, as a function of the thrust corresponding to maintaining a speed. A few additional parameters enter in, such as the temperature which acts on engine performance. Graphs are found on many airliners providing the hourly flow rate per engine as a function of the weight of the airplane, the cruising height and external parameters (wind, temperature).

At each waypoint WPT(i) of the flight, the fuel necessary to reach the destination, called TRIP FUEL (i), can be determined as a function of the flight profile to come, the estimated average wind over the route and possibly external parameters such as the temperature. The average wind data are updated at each waypoint WPT(i) and may of course differ from the initial data known to determine the fuel loads before take-off.

The fuel remaining on arrival C(i) is then determined as being equal to the fuel present in the aircraft tanks at the point i minus the fuel necessary to reach the destination TRIP FUEL(i).

Next, a fuel excess, denoted EXTRA(i), is determined relative to the statutory reserves, denoted RFA(i). Recall that these reserves are usually composed of:
   a reserve of 5% of fuel C(i) for the flight contingencies;
   a 30 minute reserve for carrying out a possible holding pattern on arrival before landing; and
   a reserve for being rerouted to an airport other than the destination.

The excess EXTRA(i) is equal to the fuel C(i) remaining on arrival minus the statutory reserves RFA(i).

The aircraft pilot provides a minimum value EXTRA-mini of the excess. Typically, the value of the excess EXTRA-mini is chosen to be positive or zero.

If the excess EXTRA(i) is less than the minimum value EXTRA-mini, the speed of the aircraft is adjusted so as to increase the excess EXTRA(i) for at least one of the forthcoming flight phases.

Advantageously, the speed is adjusted in such a way that the excess EXTRA(i) is approximately equal to the value EXTRA-mini. It is not in fact necessary to increase the excess beyond the value EXTRA-mini, which is advantageously equal to the statutory reserves. Setting the excess EXTRA-mini as close as possible to the statutory reserves allows rerouting to an airport other than that initially foreseen to be avoided without disadvantaging the cost of the flight by extending its duration.

Advantageously, the speed of the aircraft for the cruise phase ② is adjusted, then the excess EXTRA(i) redetermined.

Advantageously, the pilot is informed of the value of the excess determined. If the excess is less than a given value for at least one of the forthcoming flight phases, an aircraft speed allowing the excess to be increased is suggested to the pilot. The pilot may or may not then validate the suggested speed for the phase concerned.

Advantageously, if the excess is less than a given value, the aircraft speed for the cruise phase ② is adjusted, then the excess redetermined; if the excess is still negative, the speed of the aircraft for the ascent phase ① is adjusted, then the excess redetermined; if the excess is still negative, the speed of the aircraft for the descent phase ③ is adjusted, then the excess redetermined.

This sequence may be illustrated by taking the example of a trip between New York and San Francisco made by an airliner with a take-off weight of 200 metric tons. The flight plan of this trip foresees a cruise altitude of 35000 feet. It will be recalled that one foot is equal to 0.33 m. The altitude is expressed in feet as is usual in the aeronautical sector. The alternative airport chosen by the airline is Los Angeles. The optimization criterion provided by the airline is 100. This criterion is well known in the literature by the name "cost index". The onboard computer determines the economic speeds of the various flight phases in order to conform with the optimization criterion:

Ascent: 265 knots

Cruise: beginning at Mach 0.81, increasing to 0.82, cruise duration 5 h05

Descent: economic Mach number of 0.82, then economic speed of 320 knots.

The speeds are expressed either in Mach number or in knots as is usual in the aeronautical sector. It will be recalled that one knot is equal to one nautical mile per hour and that a nautical mile is equal to 1852 m.

While carrying 50 metric tons of fuel, and taking account of a weather forecast of headwind of 20 knots when cruising, the onboard computer determines the following predictions:

TRIP FUEL: 38 metric tons

RSV5%: 1.9 metric tons

30 MIN: 3.3 metric tons

ALTN: 5.6 metric tons

EXTRA: 50−38−1.9−3.3−5.6=1.2 metric tons

RSV5% represents the 5% reserve for the flight contingencies. 30 MIN represents the 30 minute reserve for carrying out a possible holding pattern on arrival before landing. ALTN represents the reserve for being rerouted to Los Angeles.

While running, an update of the weather data warns the airplane of an increase in average headwind when cruising to 50 knots. The onboard computer updates its predictions:

TRIP FUEL: 40.2 metric tons

RSV5%: 2 metric tons

30 MIN: 3.3 metric tons

ALTN: 5.6 metric tons

EXTRA: 50−40.2−2−3.3−5.6=−1.1 metric tons

The airplane pilot chooses a minimum excess value EXTRA-mini below which he hopes not to fall at the time of arrival in San Francisco. The choice is, for example: EXTRA-mini=0. It is therefore necessary to save 1.1 metric tons of fuel.

Figure 2:
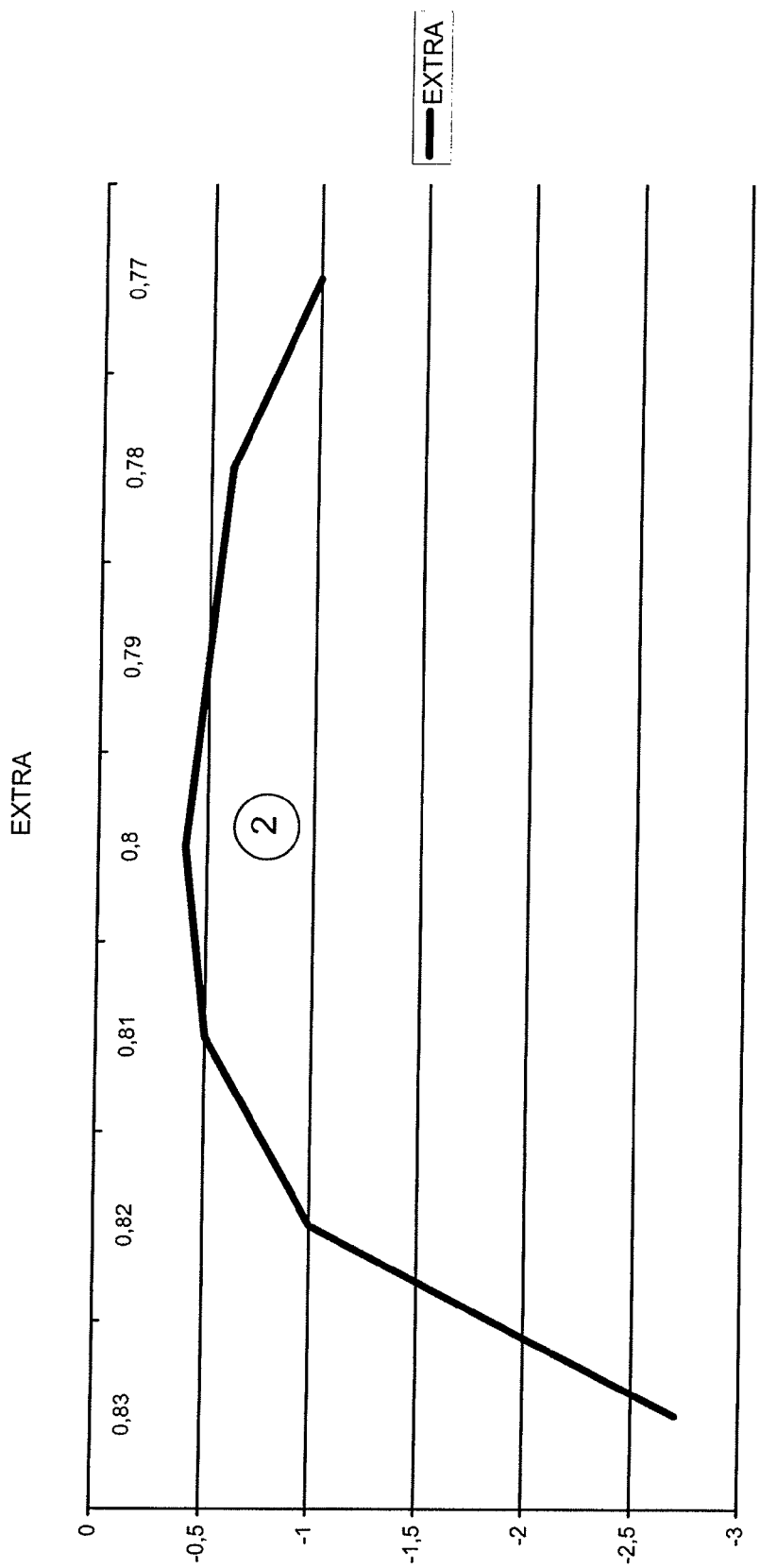
FIG. 2 shows an optimization curve for the speed of the aircraft during a cruise phase.

FIG. 2 provides an example of calculation of the excess EXTRA(i), the values of which are given on the y-axis as a function of the aircraft speed, given on the x-axis, during the cruise phase ②. The aircraft speed is expressed in Mach number. The curve representing the excess EXTRA(i) is determined with the help of performance tables allowing calculation of the mass fuel rate of flow as a function of thrust in the cruise phase. In FIG. 2 it can be seen that the excess passes through a maximum for a speed of Mach 0.8. It can also be seen that the excess, expressed here in metric tons of fuel, remains negative. The aircraft speed during the cruise phase is nonetheless modified to bring about the most economical Mach: 0.8. This extends the cruise duration by 8 minutes (to 5 h13), but allows the excess to be increased by 700 kg. 400 kg still remain to be saved.

The ascent phase is particularly suitable for a new search for a fuel saving, as it consumes fuel heavily.

The same reasoning is applied to the ascent phase. The economical ascent speed is obtained in the same manner, allowing an additional 200 kg reduction: 300 knots.

200 kg still remain to be saved. By applying the above reasoning to the descent phase, the optimum economic descent Mach number: 0.80 is obtained and the economic descent speed: 270 knots. These allow the remaining 200 kg to be saved.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method for optimizing fuel consumption of an aircraft during flight, comprising steps of at a given point of a flight:
   determining, using an onboard computer, a fuel excess relative to a statutory loads depending on a flight profile and weather conditions forecast for rest of the flight, wherein the flight comprises an ascent phase, a cruise phase and a descent phase;
   if the excess is less than a given value, for at least one of the forthcoming flight phases, adjusting a speed of the aircraft so as to increase the excess;
   redetermining, using the onboard computer, the fuel excess; and
if the excess is still less than a given value, adjusting the speed of the aircraft for another of the at least one forthcoming flight phases, wherein
   if the excess is less than the given value following the determining step, the aircraft speed for the cruise phase is adjusted;
   if the excess is still negative following the redetermining step, the speed of the aircraft for the ascent phase is adjusted, then the excess redetermined; if the excess is still negative, the speed of the aircraft for the descent phase is adjusted, then the excess redetermined.

2. The method as claimed in claim 1, wherein the speed is adjusted in such a manner that the excess is approximately equal to the value given.

3. The method as claimed in claim 1, wherein the value given is equal to the statutory loads.

4. The method as claimed in claim 1, wherein it consists in:
   informing an aircraft pilot of the value of the excess determined;
   if the excess is less than the given value for at least one of the forthcoming flight phases, suggesting the aircraft speed allowing the excess to be increased to the pilot.

* * * * *